United States Patent [19]
Wise et al.

[11] Patent Number: 4,740,491
[45] Date of Patent: Apr. 26, 1988

[54] PROCESS FOR PASSIVATING HIGH ACTIVITY TRANSITION METAL SULFIDE CATALYSTS

[75] Inventors: Henry Wise, Redwood City; Benny L. Chan, San Jose, both of Calif.

[73] Assignee: Gas Research Institute, Chicago, Ill.

[21] Appl. No.: 691,939

[22] Filed: Jan. 16, 1985

[51] Int. Cl.[4] ........................ B01J 27/02; B01J 38/08; B01J 21/18; B01J 27/24

[52] U.S. Cl. ........................ 502/216; 502/54; 502/174; 502/200; 502/219; 502/220; 502/221; 502/301

[58] Field of Search ................. 502/54, 301, 174, 200, 502/216, 219, 220, 221

[56] References Cited

U.S. PATENT DOCUMENTS

| | | | |
|---|---|---|---|
| 2,490,488 | 12/1949 | Stewart | 502/220 X |
| 2,730,533 | 1/1956 | Umhoefer | 502/301 X |
| 3,372,108 | 3/1968 | Epperly et al. | 502/54 X |
| 3,663,431 | 5/1972 | Wagner | 502/220 X |
| 4,070,305 | 1/1978 | Obayashi et al. | 502/54 |
| 4,176,092 | 11/1979 | Birkenstock et al. | 502/301 X |
| 4,199,439 | 4/1980 | Gatsis | 502/216 X |
| 4,320,030 | 3/1982 | Hoppel et al. | 502/202 |
| 4,435,481 | 3/1984 | Baldi | 502/301 X |
| 4,443,557 | 4/1984 | Baldi | 502/301 |

FOREIGN PATENT DOCUMENTS

| | | | |
|---|---|---|---|
| 0827143 | 6/1978 | U.S.S.R. | 502/54 |

*Primary Examiner*—Helen M. S. Sneed
*Assistant Examiner*—William G. Wright
*Attorney, Agent, or Firm*—Frank E. Johnston

[57] ABSTRACT

Catalysts having as their active component sulfides of vanadium, molybdenum and tungsten are contacted with ammonia or with an amine which in aqueous solution has a basic ionization constant greater than that of ammonium hydroxide to suppress deactivation of the catalysts by exposure to the atmosphere.

6 Claims, No Drawings

PROCESS FOR PASSIVATING HIGH ACTIVITY TRANSITION METAL SULFIDE CATALYSTS

TECHNICAL FIELD

This invention relates to a method of passivating highly active transition metal sulfide catalysts.

The active catalytic component of these catalysts has the formula $$MS_{1.5\text{-}3.0}$$

in which M is molybdenum, vanadium or tungsten. Other materials may be present in the finished catalyst, such as catalyst promoters and catalyst supports.

Happel et al patent 4,320,030 describes methods for preparing highly active methanation catalysts in which the active component is a sulfide or a mixture of sulfides of molybdenum, vanadium or tungsten.

The empirical atomic formula for the Happel et al catalysts is $$XY_xZ_yS_zO_wC_tN_v$$

wherein

X is a transition element or a mixture thereof selected from the group V, Mo, W

Y is a support element or a mixture thereof selected from the group Al, Si, B, Ce, Ti, Zr, where x can vary from 0 to 1

Z is a promoter element or mixture thereof selected from the group Co, Ni, Fe, Mn, where y can vary from 0 to 0.1

S is the element sulfur, where z can vary from 1.3 to 3

O is the element oxygen, where w can vary from 0 to the upper limit required by the stoichiometry C is the element carbon, where t can vary from 0 to 0.1

N is the element nitrogen, where v can vary from 0 to 0.1.

The active catalytic material is transition metal sulfide. The Y and Z materials are optionally present depending on whether a support for the sulfide or a promoter is desired. The other materials may be present in very small amounts.

These catalysts in their active state undergo exothermic reaction when exposed to air. The reaction with oxygen and adsorption of water vapor from the air results in loss of activity. When the catalysts are heated after exposure to the atmosphere, water vapor and sulfur dioxide are driven off resulting in considerable mass loss associated with the evolution of sulfer dioxide. The sulfur loss occurs at temperatures well below the temperature at which the catalyst would be employed in the methanation reaction.

The surface reaction of these catalysts with oxygen upon exposure to the atmosphere is recognized by Happel et al and they address the problem of passivating the catalyst before exposure to the atmosphere and to this end demonstrate a method of passivation.

Happel et al say, "It is important to passivate it (the catalyst) before exposure to the atmosphere. This is accomplished by passing a dilute mixture of oxygen and/or water in nitrogen over the catalyst for a sufficient period of time until no appreciable temperature rise in the catalyst bed is noticed. If this is not done, many of the catalysts prepared, especially those containing vanadium, are highly pyrophoric and will glow when removed from the reduction reactor. This high temperature is due to oxidation and results in the destruction of both the desirable, active sulfide state of the catalyst and the loss of surface area due to sintering."

The passivating method of Happel et al consists in exposing the catalyst to the very things, i.e., oxygen and water vapor, which cause activity loss but carrying out the exposure under controlled conditions by exposing the catalyst to low concentrations of oxygen for a period of time until no further temperature rise in the catalyst bed is noted. This method of passivation inherently involves an appreciable loss in catalyst activity caused by adsorption of water vapor and oxygen but the loss rate is slowed by the manner in which the contact with water vapor or oxygen is managed.

The object of the present invention is to passivate these catalysts by contacting them with materials which are adsorbed and when adsorbed preclude adsorption of oxygen and water vapor from the air. The materials are released from the catalyst at elevated temperatures but temperatures well below the temperatures employed in the methanation reaction so that the catalysts passivated by the present method are at full activity for the purpose of the methanation reaction when the carbon monoxide and hydrogen are brought into contact with them at methanation temperatures above about 450° C.

BRIEF DESCRIPTION OF THE INVENTION

Pursuant to the present invention methanation catalysts having as their active catalytic component a compound of the formula $$MS_{1.5\text{-}3}$$

M being either molybdenum, vanadium or tungsten or mixtures of two or more of these metals are contacted with ammonia or with an amine having a basic ionization constant greater than that of ammonium hydroxide for the purpose of passivating them against activity loss caused by contact with the atmosphere, in particular, with water vapor and oxygen contained in the atmosphere.

The contact between the catalyst and the passivating agent is preferably made by exposing the catalyst to an atmosphere consisting of an inert gas, such as nitrogen or helium containing from about 1 to 12% by volume of ammonia or of amine vapor. Contact between the catalyst and such a gaseous mixture is maintained for a time sufficient to substantially eliminate the tendency of the catalyst to react with atmospheric oxygen and/or water vapor. The time of contact is generally longer when the concentration of ammonia or amine in the inert gas is low and is shorter when higher concentrations are present. Time of exposure, however, is only critical in the sense that it must be long enough that further adsorption of ammonia or amine is not proceeding and that the catalyst has adsorbed sufficient of the agent to fully passivate it.

DETAILED DESCRIPTION OF THE INVENTION

An active molybdenum sulfide methanation catalyst was placed in a glass tube open at both ends. A stream of nitrogen containing 10.9% by volume of ammonia was slowly passed into the tube at room temperature, over the catalyst and out the other end of the tube.

Passage of the ammonia-nitrogen mixture through the tube was continued until the ammonia content of the entering gas and the ammonia content of the gas exiting the tube were equivalent, indicating that no further ammonia adsorption was occurring.

The catalyst was then removed from the tube and exposed to the ambient atmosphere for 300 hours. At the end of the 300 hour period the catalyst was returned to the tube and its temperature was gradually raised from atmospheric temperature to about 550° C. while passing a stream of helium over the catalyst. The helium leaving the tube was analyzed for sulfur dioxide which would indicate whether or not there had been any appreciable reaction with oxygen and water vapor by the passivated catalyst. Several catalyst samples were employed and were given the 300 hour exposure to air having varying relative humidities. The sulfur dioxide content of the material leaving the heated tube was determined in each case and it was found that where the catalyst had been exposed to a high relative humidity of 80%, the sulfur dioxide content of the effluent from the tube was only 25% of the sulfur dioxide content when an untreated catalyst was tested. Where the relative humidity of the air to which the treated catalyst was exposed was 51%, the sulfur dioxide content of the effluent from the tube was 18% of the sulfur dioxide content when untreated catalyst was similarly heated and when the relative humidity of the air to which the catalyst was exposed was 35%, the sulfur dioxide content of the effluent from the tube was just 10% of what it was for untreated catalysts similarly processed.

A molybdenum sulfide methanation catalyst, prepared pursuant to the Happel et al. method, which was subject to deactivation by contact with the normal atmosphere was treated with several reagents to determine the degree of passivation that could be achieved. Samples of this catalyst were exposed to ammonia, triethylamine, diethylamine and piperidine. Helium containing one volume percent of each of these materials was employed and the time of contact in each case was one hour. After treatment with the ammonia or amine each of the catalyst samples was stored at 25° C. in a closed chamber containing air and water vapor (50% relative humidity) for 336 hours.

In separate runs temperature of each sample was then raised at the rate of 1.2 centigrade degress per second until emission of sulfur dioxide from each sample ceased.

The following table shows the amount of sulfur dioxide released, the basicity constant of the material used to passivate the catalyst and the desorption temperature at which the maximum in sulfur dioxide desorption rate was observed.

| Material | $SO_2$ mol/g $\times 10^6$ | Basicity $K_b \times 10^4$ | Temperature at maximum $SO_2$ desorption rate |
|---|---|---|---|
| — | 536 | — | 440° C. |
| Ammonia | 313 | 0.18 | 430° C. |
| Triethylamine | 22 | 5.7 | 290° C. |
| Diethylamine | 18 | 9.6 | 327° C. |
| Piperidine | 3 | 16 | 250° C. |

It will be noted that the amines are increasingly effective as their basicity constant becomes higher. The most basic of the listed materials is piperidine, which essentially eliminated all adsorption of water vapor and oxygen on the catalyst.

While ammonia treatment of the catalysts brings about a substantial reduction in $SO_2$ loss upon heating which indicates an acceptable degree of passivation, it is preferred to employ amines having basic ionization constants greater than $5\times10^{-4}$ as the passivating agents because of their greater effectiveness.

We claim:

1. The method of passivating catalysts in which the active catalytic component is a material having the formula $MS_{1.5-3}$ in which M is a metal selected from the group consisting of molybdenum, vanadium, tungsten and their mixtures by contacting the catalysts with a material selected from the group consisting of ammonia and amines the water solutions of which have a basic ionization constant greater than that of ammonium hydroxide, said contacting being made by exposing said catalysts to an atmosphere consisting of an inert gas containing at least 1% by weight of the selected material in vapor phase and maintaining the contact until adsorption of the selected material by the catalyst ceases.

2. The method defined in claim 1 wherein the catalysts are contacted with an amine having a basic ionization constant greater than $5\times10^{-4}$.

3. The method of claim 1 wherein the active catalytic material is supported on an oxide of an element selected from the group Al, Si, B, Ce, Ti and Zr.

4. The method defined in claim 1 wherein the atmosphere to which the catalysts are exposed consists of an inert gas containing from about 1 to 12 weight percent of the selected material.

5. The method of passivating catalysts having the empirical atomic formula $$XY_xZ_yS_zO_wC_tN_v$$

wherein

X is a transition element or a mixture thereof selected from the group V, Mo, W

Y is a support element or a mixture thereof selected from the group Al, Si, B, Ce, Ti, Zr, where x can vary from 0 to 1

Z is a promoter element or mixture thereof selected from the group Co, Ni, Fe, Mn, where y can vary from 0 to 0.1

S is the element sulfur, where z can vary from 1.3 to 3

O is the element oxygen, where w can vary from 0 to the upper limit required by the stoichiometry C is the element carbon, where t can vary from 0 to 0.1

N is the element nitrogen, where v can vary from 0 to 0.1, and which undergo substantial and rapid deactivation when exposed to the atmosphere by contacting said catalysts with a material selected from the group consisting of ammonia and amines which in aqueous solution have a basic ionization constant greater than that of ammonium hydroxide, said contacting being made by exposing said catalysts to an atmosphere consisting of an inert gas containing at least 1% by weight of the selected material in vapor phase for a time sufficient to substantially prevent reaction with oxygen and/or water vapor with the catalyst when it is exposed to the atmosphere.

6. The method of treating a granular catalyst in which the active catalytic material is a pyrophoric compound having the formula $MS_{1.5-3}$ in which M is a metal selected from the group consisting of molybdenum, vanadium, tungsten and their mixtures to render the active catalytic material non-pyrophoric when it is exposed to the atmosphere, which comprises exposing the catalyst to an atmosphere consisting of an inert gas containing at least 1% by weight of an amine having a basic ionization constant greater than $5\times10^{-4}$ and continuing the exposure until adsorption of the amine substantially ceases.

* * * * *